Nov. 10, 1953        W. V. SPURLIN        2,658,286
HELICAL VIBRATORY CONVEYER
Filed Aug. 31, 1949        3 Sheets-Sheet 1
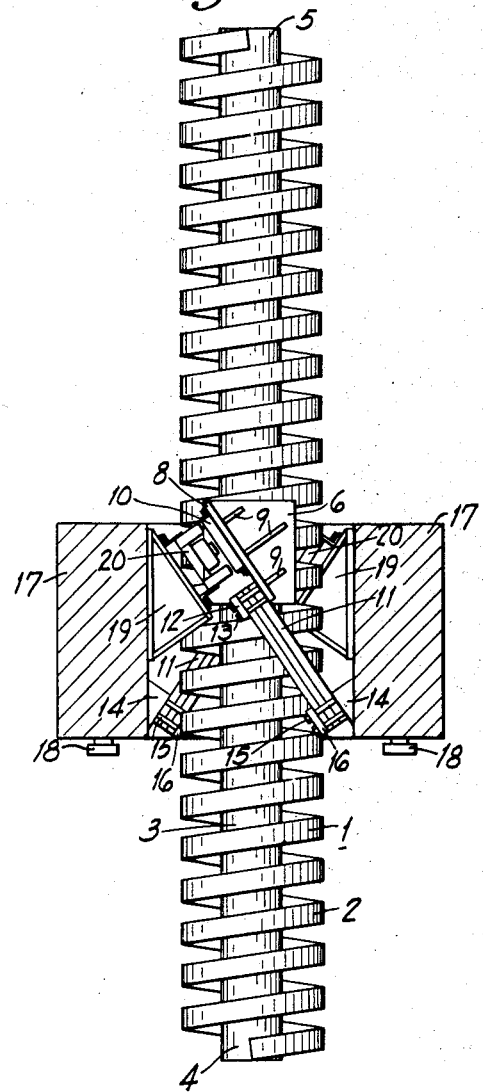
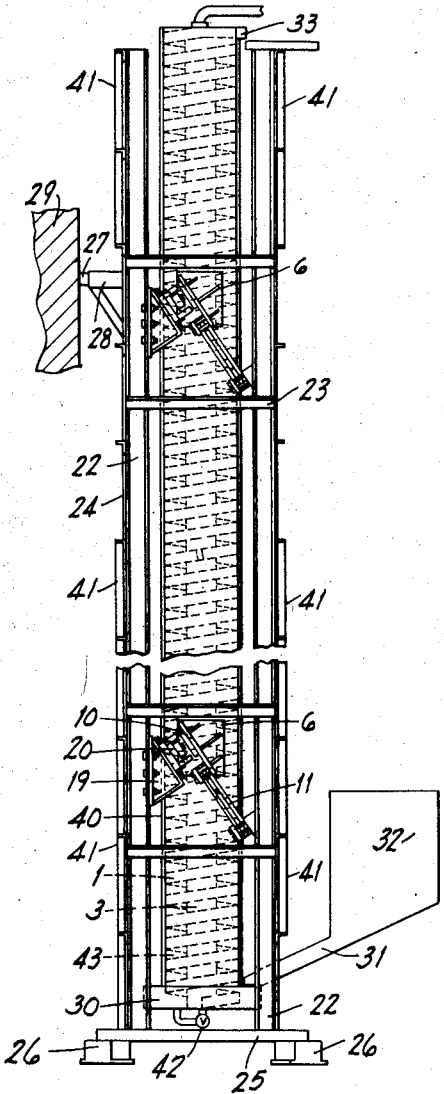
INVENTOR.
WILLIAM V. SPURLIN
BY
HIS ATTORNEY Nov. 10, 1953    W. V. SPURLIN    2,658,286
HELICAL VIBRATORY CONVEYER
Filed Aug. 31, 1949    3 Sheets-Sheet 2
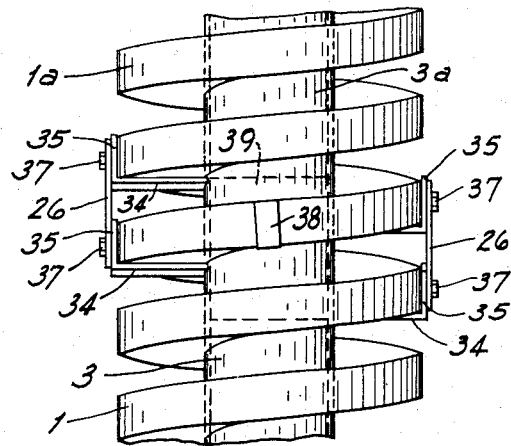
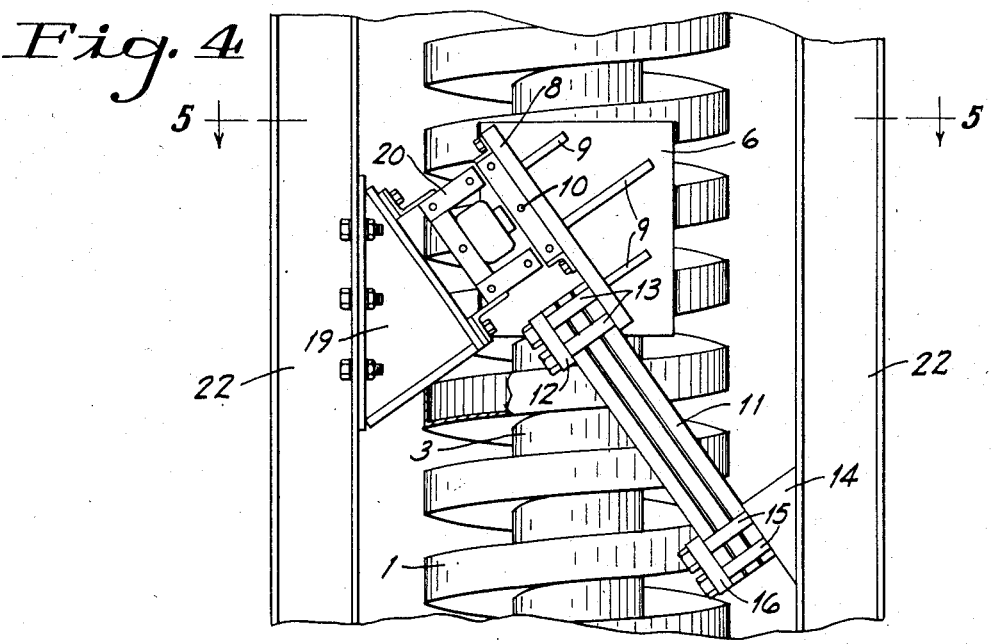
INVENTOR.
WILLIAM V. SPURLIN
BY
HIS ATTORNEY.

Nov. 10, 1953    W. V. SPURLIN    2,658,286
HELICAL VIBRATORY CONVEYER
Filed Aug. 31, 1949    3 Sheets-Sheet 3
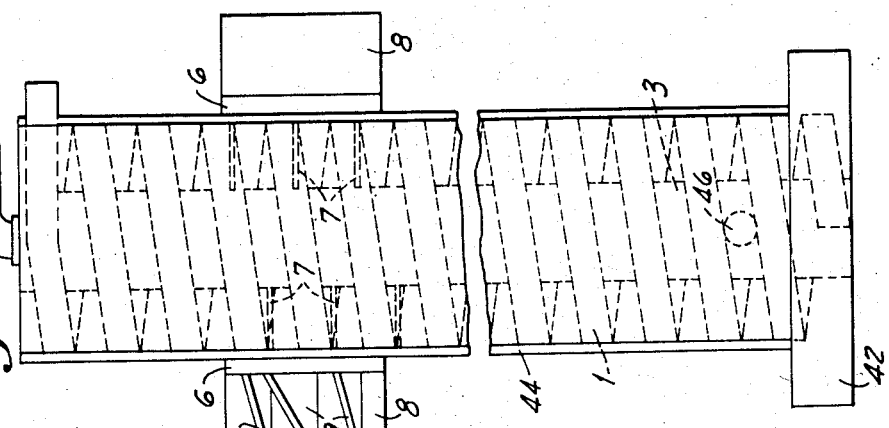
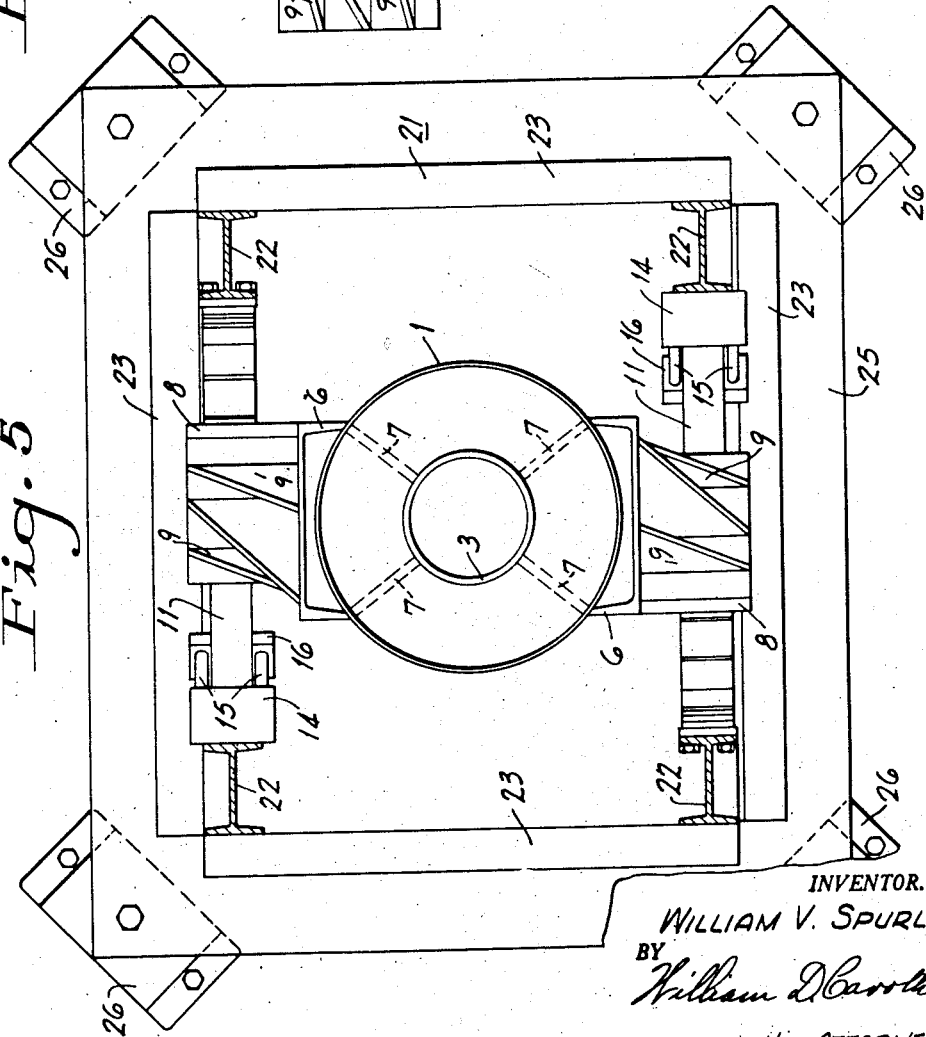
INVENTOR.
WILLIAM V. SPURLIN
BY
His ATTORNEY

Patented Nov. 10, 1953

2,658,286

UNITED STATES PATENT OFFICE 2,658,286

HELICAL VIBRATORY CONVEYER

William V. Spurlin, Indiana, Pa., assignor to Syntron Company, Homer City, Pa., a corporation of Delaware Application August 31, 1949, Serial No. 113,290

12 Claims. (Cl. 34—147)

This invention relates generally to vibratory helical conveying of bulk material for considerable vertical distances and more particularly to multisectioned and multipowered helical conveyors.

Small and relatively short helical conveyors have been made and operate successfully when powered with one or a multiple of electromagnetic vibratory motors designed to vibrate the spring supported base at one end of the conveyor. However, there is a limit as to height that such end driven conveyors can be made. When a helical conveyor is of sufficient length to vibrate and twist within itself, it loses its efficiency as a conveyor. When it is braced or enclosed in a tube, the internal vibration still subsists, causing the reinforcing straps and tubes to crack and break.

The present invention overcomes these difficulties by suspending and driving the vibratory helical conveyor intermediate of its ends. With this improved construction a relatively larger helical conveyor section may be made to operate at high efficiency. For example, a helical conveyor approximately fourteen inches in diameter will function efficiently when it is more than eight feet in length when it is suspended and driven from the center. This size of conveyor would have internal vibration and be inefficient if supported and operated from one end.

Another very important feature of this invention resides in the fact that a plurality of helical conveyor sections, each of which is independently supported and powered intermediate of its ends, may be attached end-to-end with one another and provide a helical conveyor of any desired length.

Another very important object of this invention resides in the fact that an extended or jointed helical conveyor of the character disclosed herein is adaptable for use with other treating apparatus for the purpose of burning, drying, cooling or otherwise thermally or chemically treating the commodity being conveyed during its unattended passage through the helical conveyor.

The helical conveyor sections making up this invention are not only independent from one another, but the plurality of motors at different levels are supported on an isolated frame that prevents the building from being wrecked by vibration. The frame may be supported at the bottom and at different elevations, but should be supported through resilient members known as isolators that will not transmit any vibratory motion to the building.

In mounting the motor armature and springs to the center of the helical conveyor section, it is an object of this invention to provide a rigid construction that will cause the whole of the section to vibrate as a unit. It is preferable to employ a central member, such as a tube, around which the helical conveying surface is secured. In mounting the armature and spring end to the intermediate portion of the conveyor section, it is preferable to support them on a plate tied directly from the central member by stiffening ribs extending radially therefrom.

The inlet and discharge ends of each section of the assembled group of sections are made symmetrically relative to each other and to the central axis of the helix to prevent any undue overbalance or eccentrically positioned mass that would tend to disturb or otherwise overbalance the systems and produce inefficient conveying.

The high speed reciprocating forces, created by the electromagnetic motors in vibrating a long integral helical conveyor from one end, cause the metal to flex beyond its elastic limit and thereby break the conveyor or conveyor parts. Such elastic limits may be determined and before the point of fatigue is reached, another set of electromagnetic motors may be placed on the same helical conveyor at spaced vertical intervals so that portions will operate in synchronism and thereby prevent the helical conveyor from exceeding its elastic limit which would ordinarily cause it to break. Improperly located motors will break such a helical conveyor regardless of whether the conveyor sections are actually fabricated in one long continuous unit or in welded sections. It is therefore a principal object of this invention to locate the points of application of support and vibratory power intermediate the length of the conveyor to prevent internal vibrations causing destruction of the conveyor.

The electromagnetic forces, in oscillating the conveyor in an arcuate path, should always be so positioned along the conveyor to prevent it from breaking down and also to avoid distorted movement in the conveyor itself which causes inefficient conveying making it difficult to control the flow of material therethrough.

Other objects and advantages appear hereinafter in the following description and claims.

The accompanying drawings show for the purpose of exemplification, without limiting the specification or claims thereto, certain practical embodiments of this invention wherein:

Fig. 1 is a view in side elevation of a single helical conveyor section with the vibratory motor armature and supporting springs attached to the central part thereof;

Fig. 2 is a view in side elevation with parts broken away to show an enclosed multisectioned helical conveyor;

Fig. 3 is an enlarged view in elevation showing the manner of connecting the adjacent conveyor sections shown in Fig. 2;

Fig. 4 is an enlarged view in elevation showing the motor mounting of a conveyor section;

Fig. 5 is a view in horizontal section taken on the line 5—5 of Fig. 4;

Fig. 6 is a view in side elevation of a helical conveyor within a tube and supported intermediate of its ends;

Fig. 7 is a plan view of a tangential discharge for this helical conveyor; and

Fig. 8 is a plan view of a spiral discharge for this helical conveyor.

Referring particularly to Fig. 1 of the drawings, the helical conveyor section is illustrated at 1 and consists of a spirally arranged conveyor trough 2 mounted on a central tube 3 and extending from its lower end, as indicated at 4, and to the upper end, as indicated at 5. Intermediate of its ends, and on both sides thereof, the helical conveyor 1 is provided with supporting channel plates 6 that are connected to the helical sections and also directly to the tube 3 by means of the stiffening brace members 7, as shown in Fig. 5. Each supporting plate 6 is in the form of a channel and has a lateral or outwardly projecting mounting plate 8, the surface of which slopes and is disposed at ninety degrees to the face of the channel plate member 6. The mounting plate 8 is braced or backed by three triangularly shaped members 9. The face of the mounting plate 8 is arranged to support the armature member 10 and the upper ends of the spring members 11. The spring members 11 are clamped to the mounting plate 8 by means of the clamping strap 12 and the bolts 13. The other set of springs and armature member are secured to a similar plate which is diametrically opposite to that as shown at 8.

As shown in the enlarged detail views of Figs. 4 and 5, the channel member 6 is secured to a plurality of adjacent turns of the conveyor trough as by welding, and each trough section is provided with a radially disposed reinforcing arm 7 that extends from the flanges of the channel member 6 along the bottom of the adjacent conveyor surface and to the tube 3, as shown in Fig. 5, and is secured thereto by welding.

The armature and spring mounting plates or hangers 8 are also welded to the outer surface of their channel plate members 6 and to two small and one large triangular bracing flange members 9. The underside of the plate 8 is a flat seat and, as stated before, arranged to support the armature 10 and the upper ends of the springs 11 and the magnetic lines of force of the motor are normal to the longitudinal axis of the springs.

The lower ends of the spring members 11 are clamped to the sloping seat or surface on the block 14 by the bolts 15 and the clamping strap 16. A block 14 is secured to the inner surface of the massive annular collar 17 which in turn is supported by the resilient isolators 18 as shown. The opposite wall of the collar 17 has mounted thereon the triangular bracket 19 for the purpose of supporting the electromagnetic field member 20 of the vibratory motor in operative spaced relation with the armature 10.

It will be noted that the electromagnetic field member has spaced poles which are in alignment with the armature member 10 that is secured to the plate 8.

The structure as shown in Fig. 2 provides a series of the conveyor sections 1, which series may comprise many conveyor sections. Each of the motor and spring supporting units of the helical conveyor sections are mounted on the vertical frame 21 that consists of four vertical corner members 22 of H cross section which are tied together by transverse angle members 23 and braced diagonally on opposite sides by the strap members 24. The frame 21 is supported at its lower end on the base member 25 that is in turn supported by the isolators 26. The isolators 26 are preferably made of an elastomer such as rubber or plastic material that will absorb any vibration that is transmitted to the frame 21 by the electromagnetic motors and prevent such vibration from being retransmitted to the building. Another series of isolators 27 is connected by the angle bracket members 28 to intermediate portions of the frame for supporting the frame 21 to the building structure indicated at 29.

In Fig. 2, the lowermost conveyor section 1 is provided with an annular trough 30 for receiving bulk material, as from the chute 31 delivering the material from the supply hopper 32. The flow of material from chute 31 may of course be controlled and when the material is directed to the annular receiving trough 30, the vibrations cause the material to flow in a circular path about the axis of the tube 3 and up the inclined path produced by the helical conveyor. The top of the uppermost conveyor section is provided with a laterally extending or tangential discharge tube 33 which is also shown in Fig. 7 or this discharge tube may be constructed along a spiral such as shown at 33' in Fig. 8. Such discharge tubes may lead the material to another bin or hopper or down another conveyor or any other desirable distribution arrangement.

As shown in Fig. 3, the ends of the adjacent conveyor sections 1 and 1a are provided with radially extending ribs 34 having their outer ends turned up as indicated at 35 on opposite sides of the conveyor member. These radial members stiffen each conveyor section adjacent its ends and when tied together by the strap plates 26, which are bolted or welded to the upstanding portions 35 of the radial member 34 by means of the bolts 37, the subjacent conveyor sections may be secured to one another and they will vibrate together as a unit with each pair of motors supplying vibratory power for its respective section. The abutting sections of the tube 3 and 3a and the abutting sections of the conveying surface proper may be welded together as indicated at 38. A centering device such as a tube or pin may be employed within the tubes 3 and 3a for the purpose of properly aligning and maintaining the center of these tubes on different conveyor sections in fixed axial relation with one another, as indicated in dotted lines at 39.

As shown in Fig. 2, the several sections of the helical conveyor 1, which when tied together form one continuous helical conveyor, may be surrounded by an enclosing housing, such as indicated at 40, and again the whole of the frame may be covered as indicated by the sheeting as 41. Also, the upper and lower ends of the tube 3 may be provided with flexible conduits for the purpose of directing fluids through the tube to heat or cool the same. Thus, a material may be fed to a helical conveyor of this character which is completely enclosed for thermal or chemical treatment. However, upon the application of heat through the tubes 3 and the circulation of a fluid heating medium through the inner and outer shells 40 and 41, the material may be dried as it progresses from one end of the conveyor to the other. The hot gases passing down the tube 3 may be directed by the valve 42 into the helical space 43, from whence it may be drawn up with the material around the helix of the conveyor, as indicated, and finally exhausted from the top of the conveyor with the material. Another heat treating medium may be circulated between the covers 40 and 41 which is isolated from the material, but effective in thermally heat treating the same.

In the structure as shown in Fig. 6, a helical conveyor 1 is not only mounted on the tube 3, but is also mounted within a heavy tube 44. The conveyor may have radial bracing members 7 along the undersurface of one or more of the conveyor surfaces for the purpose of bracing the tube 44 at or adjacent the channel member 6, which is welded to the outside of the tube 44 and is provided with the three triangular plates 9 that aid in rigidly supporting the suspension plates 8 on each side of the conveyor.

With the structure of Fig. 6, treating gas may be supplied at either the upper or lower end of the tube 3 through the flexible inlet 45 and pass downwardly through the tube 3 to the port 46, from whence it passes into the conveyor chamber within the tube 44 and travels upwardly and is discharged at the top thereof with the material itself, the material being supplied in the annular trough 42 in the same manner as that previously described. When the conditioning atmosphere is thermal, it is effective on and through the tube and conveying surface all of the time that the material is traveling through the conveyor. A double tube conveyor of this type may be readily joined axially with additional conveyor sections.

I claim:

1. A conveyor consisting of a vertically disposed rigid helical conveyor having a series of turns about a central axis and having inlet and outlet openings to receive and discharge material at different elevations, a plurality of spring means disposed about said central axis and mounted to support said helical conveyor intermediate of its ends for reciprocation in a confined inclined arcuate path of movement about said central axis, a plurality of electromagnetic reciprocating motors energized by current impulses, and means for mounting said motors symmetrically to said central axis to be effective in imparting their magnetic forces to said conveyor to reciprocate it in its confined inclined arcuate path of movement.

2. A conveyor consisting of a vertically disposed rigid helical conveyor having a series of turns about a central axis and having inlet and outlet openings to receive and discharge material at different elevations, a plurality of spring means disposed about said central axis and mounted to support said helical conveyor from a central transverse plane for reciprocation in a confined inclined arcuate path of movement about said central axis, a plurality of electromagnetic reciprocating motors energized by current impulses, and means for mounting said motors symmetrically to said central axis to be effective in imparting their magnetic forces to said conveyor to reciprocate it in its confined inclined arcuate path of movement.

3. A conveyor consisting of a vertically disposed rigid helical conveyor having a series of turns about a central axis and having inlet and outlet openings to receive and discharge material at different elevations, a plurality of spring means disposed about said central axis and mounted to support said helical conveyor intermediate of its ends for reciprocation in a confined inclined arcuate path of movement about said central axis, a plurality of electromagnetic reciprocating motors each having an armature member and a field member, means to secure one member of each motor to the conveyor symmetrically of said axis, and means to mount the other member of each motor in operative spaced relation to its other member, the field member of said motors being energized by electric impulses to directly impart magnetic forces symmetrically to the conveyor and be effective to reciprocate it in its confined inclined arcuate path of movement.

4. A conveyor consisting of a vertically disposed digid helical conveyor member having a series of turns about a central axis and having inlet and outlet openings to receive and discharge material at different elevations, a plurality of hangers secured to said conveyor member intermediate the upper and lower ends thereof and having a sloping seat, a resiliently mounted frame carrying a lug for each hanger, each of said lugs having a seat disposed in alignment with the seat of the corresponding hanger, spring means for each hanger attached to the seats of the hangers and lugs to support the conveyor for reciprocation in a confined inclined arcuate path of movement, a plurality of electromagnetic reciprocating motors energized by current impulses, and means for mounting said motors symmetrically to said central axis to be effective in imparting their magnetic forces to said conveyor member for reciprocating it in its confined inclined arcuate path of movement.

5. A conveyor consisting of a vertically disposed rigid helical conveyor member having a series of turns about a central axis and having inlet and outlet openings to receive and discharge material at different elevations, a plurality of hangers secured to said conveyor member intermediate the upper and lower ends thereof and having a sloping seat, a resiliently mounted frame carrying a lug for each hanger, each of said lugs having a seat disposed in alignment with the seat of the corresponding hanger, spring means for each hanger attached to the seats of the hangers and lugs to support the conveyor for reciprocating in a confined inclined arcuate path of movement, a plurality of electromagnetic reciprocating motors each having an armature member and a field member, one member of a motor secured to each hanger and the corresponding motor member secured to the frame for mounting in operative spaced relation relative to its other member, the field member of each motor being energized by electric impulses to directly impart magnetic forces symmetrically to the conveyor and be effective to reciprocate it in its confined inclined arcuate path of movement.

6. A helical conveyer consisting of a hollow vertical frame, resilient isolators carrying said frame, a series of rigid helical conveyor sections attached end-to-end to provide a single conveyor with a central vertical axis within said frame and having inlet and outlet openings to receive and discharge material at different elevations, a plurality of spring means attached to each conveyor section intermediate of its ends, said spring means secured to said frame to support each of the helical conveyor sections for reciprocation as a unit in a confined inclined arcuate path of movement about said central axis, a plurality of electromagnetic reciprocating motors energized by current impulses, and means for mounting said motors symmetrically to said central axis to be effective in imparting their magnetic forces to the conveyor sections to reciprocate them in unison in their confined inclined arcuate path of movement.

7. A structure of character described consisting of a hollow vertical frame, resilient isolators for supporting said frame, a conveyor within the frame having a vertically disposed central tube with a helical conveying surface secured thereto which has inlet and outlet openings for receiving and discharging materials at different elevations, a plurality of spring means attached to said conveyor intermediate of its ends, said spring means secured to said frame to support the conveyor for reciprocation in a confined inclined arcuate path of movement, a plurality of electromagnetic reciprocating motors energized by current impulses, and means for mounting said motors symmetrically to the central axis of the conveyor to be effective in imparting their magnetic forces to be effective in reciprocating said conveyor in its confined inclined arcuate path of movement.

8. The structure of claim 7 characterized in that said helical conveying surface is secured to the exterior of said tube.

9. The structure of claim 7 characterized in that said helical conveying surface is secured to the interior of said tube.

10. The structure of claim 7 which also includes flexible conduit means attached to said tube for circulating conditioned fluid therethrough effective in treating the materials handled by the conveyor.

11. The structure of claim 7 which also includes a hood enclosing said frame and conveyor, and conduit means attached to said hood for circulating conditioned fluid therethrough effective in treating the material handled by the conveyor.

12. The structure of claim 7 which also includes a hood enclosing said frame and conveyor, a conduit opening into the chamber formed by the hood, and a second conduit connected to one end of said tube for circulating conditioned fluid through the hood and the tube to be effective in treating the material handled by the conveyor.

WILLIAM V. SPURLIN.

References Cited in the file of this patent

UNITED STATES PATENTS

| Number | Name | Date |
|---|---|---|
| 973,921 | Dodge | Oct. 25, 1910 |
| 1,611,098 | Borner | Dec. 14, 1926 |
| 1,859,450 | Marshall | May 24, 1932 |
| 2,044,628 | O'Toole | June 16, 1936 |
| 2,374,664 | Carrier | May 1, 1945 |
| 2,407,357 | Weyandt | Sept. 10, 1946 |
| 2,464,216 | Devol | Mar. 15, 1949 |

FOREIGN PATENTS

| Number | Country | Date |
|---|---|---|
| 446,468 | Great Britain | Apr. 30, 1936 |
| 362,975 | Italy | Sept. 13, 1938 |